US008015817B2

(12) United States Patent
Charron et al.

(10) Patent No.: US 8,015,817 B2
(45) Date of Patent: Sep. 13, 2011

(54) COOLING STRUCTURE FOR GAS TURBINE TRANSITION DUCT

(75) Inventors: Richard Charron, West Palm Beach, FL (US); Gary Snyder, Jupiter, FL (US); Kenneth K. Landis, Tequesta, FL (US)

(73) Assignee: Siemens Energy, Inc., Orlando, FL (US)

( * ) Notice: Subject to any disclaimer, the term of this patent is extended or adjusted under 35 U.S.C. 154(b) by 461 days.

(21) Appl. No.: 12/481,713

(22) Filed: Jun. 10, 2009

(65) Prior Publication Data

US 2010/0316492 A1 Dec. 16, 2010

(51) Int. Cl.
*F02C 1/00* (2006.01)

(52) U.S. Cl. .......................................... 60/752; 60/39.37

(58) Field of Classification Search ............ 60/752–760, 60/39.37; 415/115, 116, 117, 176, 178; 428/72, 428/86, 138, 163, 166, 167, 169, 178, 188
See application file for complete search history.

(56) References Cited

U.S. PATENT DOCUMENTS 3,825,364 A * 7/1974 Halila et al. .................. 415/116
4,526,226 A * 7/1985 Hsia et al. .................. 165/109.1
4,573,865 A * 3/1986 Hsia et al. ..................... 415/115
4,695,247 A 9/1987 Enzaki et al.
4,719,748 A 1/1988 Davis, Jr. et al.
5,467,815 A 11/1995 Haumann et al.
5,581,994 A 12/1996 Reiss et al.
5,782,294 A 7/1998 Froemming et al.
5,993,150 A * 11/1999 Liotta et al. ................... 415/115
6,018,950 A 2/2000 Moeller
6,116,852 A * 9/2000 Pierre et al. ................... 415/115
6,155,055 A * 12/2000 Forestier ......................... 60/747
6,276,142 B1 * 8/2001 Putz ................................ 60/752
6,341,485 B1 1/2002 Liebe
6,890,148 B2 5/2005 Nordlund
7,270,175 B2 9/2007 Mayer et al.
7,310,938 B2 12/2007 Marcum et al.
2003/0106317 A1 6/2003 Jorgensen et al.
2003/0131980 A1 * 7/2003 DeMarche et al. ........... 165/169
2010/0000197 A1 * 1/2010 Snyder et al. .................. 60/39.5

* cited by examiner

*Primary Examiner* — Michael Cuff
*Assistant Examiner* — Phutthiwat Wongwian

(57) ABSTRACT

A transition duct for conveying hot combustion gas from a combustor to a turbine in a gas turbine engine. The transition duct includes a panel including a middle subpanel, an inner subpanel spaced from an inner side of the middle subpanel to form an inner plenum, and an outer subpanel spaced from an outer side of the middle subpanel to form an outer plenum. The outer subpanel includes a plurality of outer diffusion holes to meter cooling air into the outer plenum. The middle subpanel includes a plurality of effusion holes to allow cooling air to flow from the outer plenum to the inner plenum. The inner subpanel includes a plurality of film holes for passing a flow of cooling air from the inner plenum through the film holes into an axial gas flow path adjacent to the inner side of the inner subpanel.

18 Claims, 6 Drawing Sheets

COOLING STRUCTURE FOR GAS TURBINE TRANSITION DUCT

FIELD OF THE INVENTION

The present invention relates generally to gas turbine engines and, more particularly, to a transition duct for conveying hot combustion gas from a combustor to a turbine section of a gas turbine engine.

BACKGROUND OF THE INVENTION

Combustion turbines generally comprise a casing for housing a compressor section, a combustor section and a turbine section. Each one of these sections comprise an inlet end and an outlet end. A combustor transition duct is mechanically coupled between the combustor section outlet end and the turbine section inlet end to direct a working gas from the combustor section into the turbine section.

The working gas is produced by combusting an air/fuel mixture. A supply of compressed air, originating from the compressor section, is mixed with a fuel supply to create a combustible air/fuel mixture. The air/fuel mixture is combusted in the combustor to produce a high temperature and high pressure working gas. The working gas is ejected into the combustor transition duct to direct the working gas flow exiting the combustor into the first stage of the turbine section.

As those skilled in the art are aware, the maximum power output of a gas turbine is achieved by heating the gas flowing through the combustion section to as high a temperature as is feasible. The hot working gas, however, may produce combustor section and turbine section component metal temperatures that exceed the maximum operating rating of the alloys from which the combustor section and turbine section are made and, in turn, may induce premature stress and cracking along various turbomachinary components. In particular, the high firing temperatures generated in the combustion section, combined with the complex geometry of the transition duct, can lead to temperature-limiting levels of stress within the transition duct. Materials capable of withstanding extended high temperature operation are used to manufacture transition ducts, and ceramic thermal barrier coatings may be applied to the base material to provide additional protection. Air cooling may also be provided, such as by utilizing shell air provided from the compressor section to the casing of the combustor section surrounding the transition ducts. For example, cooling air may be routed through cooling passages formed in the transition duct, or it may be impinged onto the outside (cooled) surface of the transition duct, or it may be allowed to pass through holes from the outside of the transition duct to the inside of the duct to provide a barrier layer of cooler air between the combustion air and the duct wall (effusion cooling).

There continues to be a need to improve the cooling of transition ducts to permit operation at higher working gas temperatures, while also reducing or minimizing the cooling air requirement associated with the increased working gas temperatures in order provide improved efficiencies in the output of gas turbine engines.

SUMMARY OF THE INVENTION

In accordance with one aspect of the invention, a panel of a transition duct for a gas turbine engine is provided. The panel comprises a middle subpanel having an inner side and an outer side; an inner subpanel having inner and outer sides, and located adjacent to the inner side of the middle subpanel;

and an outer subpanel having inner and outer sides, and located adjacent to the outer side of the middle subpanel. Inner spacer members extend from the inner side of the middle subpanel and are attached to the outer side of the inner subpanel to space the inner subpanel out of contact with the middle subpanel and define an inner plenum between the middle subpanel and the inner subpanel. Outer spacer members extend from the outer side of the middle subpanel and are attached to the inner side of the outer subpanel to space the outer subpanel out of contact with the middle subpanel and define an outer plenum between the middle subpanel and the outer subpanel. A plurality of effusion holes are formed through the middle subpanel connecting the outer plenum to the inner plenum. A plurality of outer diffusion holes are formed through the outer subpanel for passing a flow of cooling air from a high pressure region surrounding the outer side of the outer subpanel through the outer diffusion holes into the outer plenum, and a plurality of film holes are formed through the inner subpanel for passing a flow of cooling air from the inner plenum through the film holes into a hot gas flow adjacent to the inner side of the inner subpanel.

In accordance with another aspect of the invention, a transition duct is provided for conveying hot combustion gas from a combustor to a turbine in a gas turbine engine. The transition duct comprises a panel including a middle subpanel, an inner subpanel, and an outer subpanel. The inner subpanel is located in spaced relation to an inner side of the middle subpanel to define an inner plenum between the middle and inner subpanels. The outer subpanel is located in spaced relation to an outer side of the middle subpanel to define an outer plenum between the middle and outer subpanels. The inner subpanel includes an inner side defining an axial gas flow path through the transition duct. A plurality of effusion holes are formed through the middle subpanel connecting the outer plenum to the inner plenum. A plurality of outer diffusion holes are formed through the outer subpanel for passing a flow of cooling air from a high pressure region surrounding the outer subpanel through the outer diffusion holes into the outer plenum, and a plurality of film holes are formed through the inner subpanel for passing a flow of cooling air from the inner plenum through the film holes into the axial gas flow path adjacent to the inner side of the inner subpanel.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
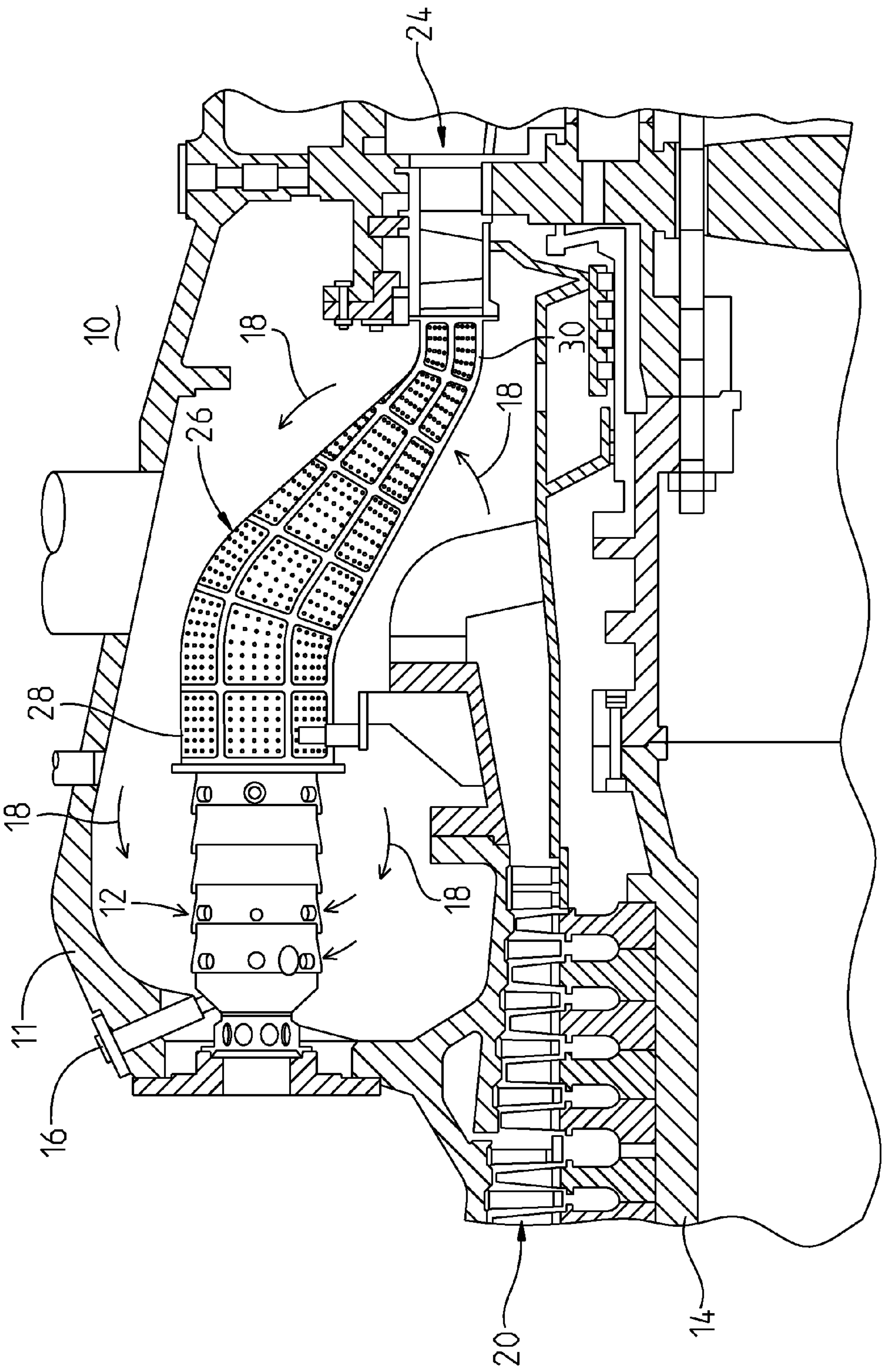
FIG. 1 is a partial cross-sectional view of a gas turbine engine incorporating a transition duct in accordance with the present invention.

Referring to FIG. 1, an exemplary gas turbine engine 10 is illustrated for the purpose of illustrating the present invention. However, it should be understood that this invention may be applied to various turbine engine constructions and is not limited to the particular construction shown herein.

Figure 2:
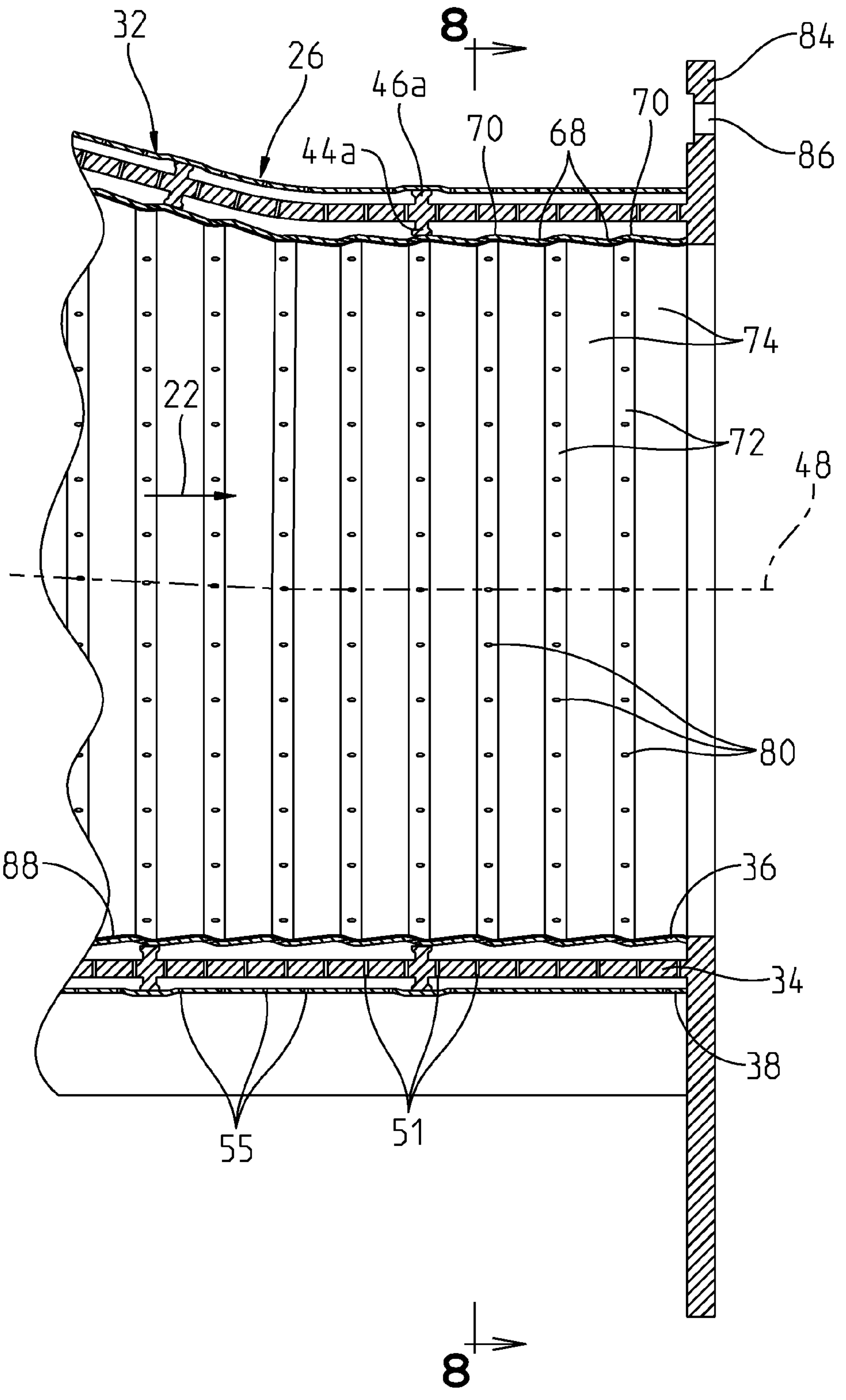
FIG. 2 is a cross-sectional view of an outlet end of the transition duct.

The engine 10 includes a casing 11 and a plurality of combustors 12 (only one illustrated) supported in the casing 11 and arranged in an annular array about a rotatable shaft 14. The combustors 12 receive a combustible fuel from a fuel supply 16 and compressed air 18 from a compressor 20 that is driven by the shaft 14. The fuel is mixed and combusted with the compressed air within the combustors 12 to produce hot combustion gas 22 (FIG. 2). The combustion gas 22 is expanded through a turbine 24 to produce work for driving the shaft 14.

The hot combustion gas 22 is conveyed from each of the combustors 12 to the turbine 24 by a respective transition duct 26. In accordance with the illustrated embodiment, the transition ducts 26 each have a generally cylindrical shape at an inlet end 28 corresponding to the shape of the combustor 12, and the transition ducts 26 each have a generally rectangular shape at an outlet end 30 corresponding to a respective arc-length of an inlet to the turbine 24.

Figure 4:
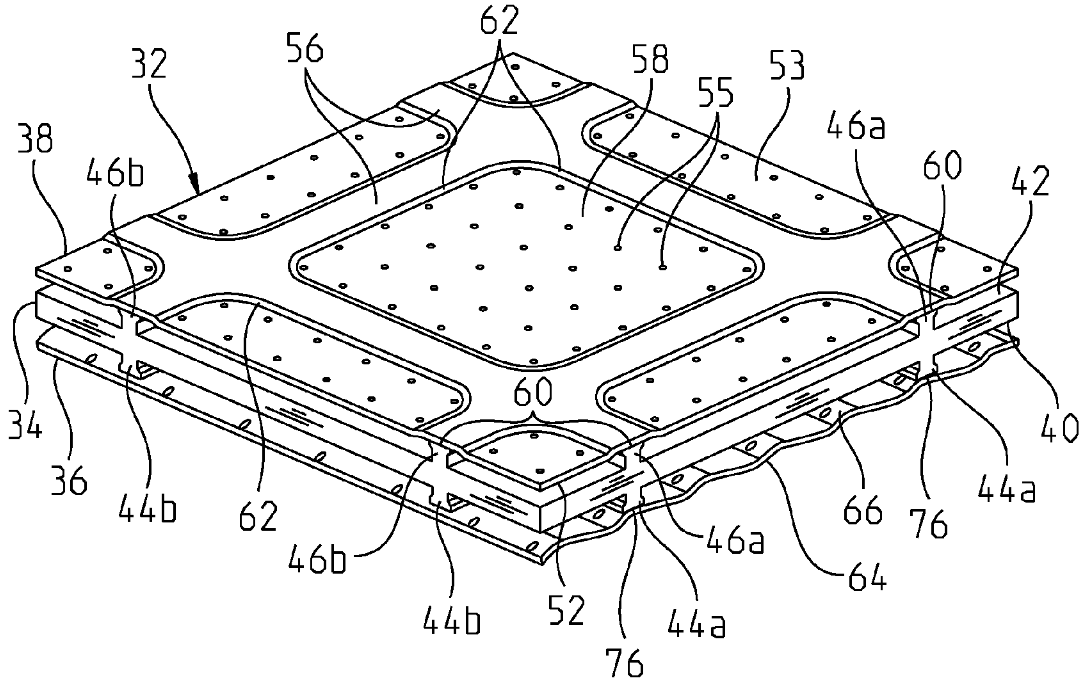
FIG. 4 is a perspective view of a section of the panel for forming the transition duct, viewing an outer surface of the panel and illustrating outer and inner subpanels attached to the middle subpanel.

Referring to FIG. 2, a section of the outlet end 30 of the transition duct 26 is illustrated. The transition duct 26 comprises a panel or panel structure 32 having a three-layer construction including a middle subpanel 34, an inner subpanel 36 and an outer subpanel 38 (FIG. 4). The middle subpanel 34, inner subpanel 36 and outer subpanel 38 are joined together to form the panel structure 32 as a unitary or integral structure, as is described further below.

The middle subpanel 34 comprises a main structural member of the transition duct 26, extending along the length and around the periphery of the duct 26, and includes an inner side 40 and an outer side 42, see FIGS. 3-5 and 7. Inner spacer members, comprising inner ribs 44, extend radially inwardly from the inner side 40 of the middle subpanel 34. Outer spacer members, comprising outer ribs 46, extend radially outwardly from the outer side 42 of the middle subpanel 34.

The inner ribs 44 comprise inner circumferential rib members 44*a* spaced axially from each other and extending around the circumference of the inner side 40 of the middle subpanel 34, transverse to an axis 48 (FIG. 2) of the duct 26. The inner ribs 44 further comprise inner axial rib members 44*b* spaced circumferentially from each other and extending generally parallel to the duct axis 48.

The outer ribs 46 comprise outer circumferential rib members 46*a* spaced axially from each other and extending around the circumference of the outer side 42 of the middle subpanel 34, transverse to the duct axis 48. The outer ribs 46 further comprise outer axial rib members 46*b* spaced circumferentially from each other and extending generally parallel to the duct axis 48. The inner and outer ribs 44, 46 may comprise generally similar structures, i.e., mirror structures, on the opposite sides 40, 42 of the middle subpanel 34. Further, the inner and outer ribs 44, 46 are preferably formed integral with the middle subpanel 34 and may be formed, for example, by mechanical or chemical milling of the middle subpanel 34.

Figure 3:
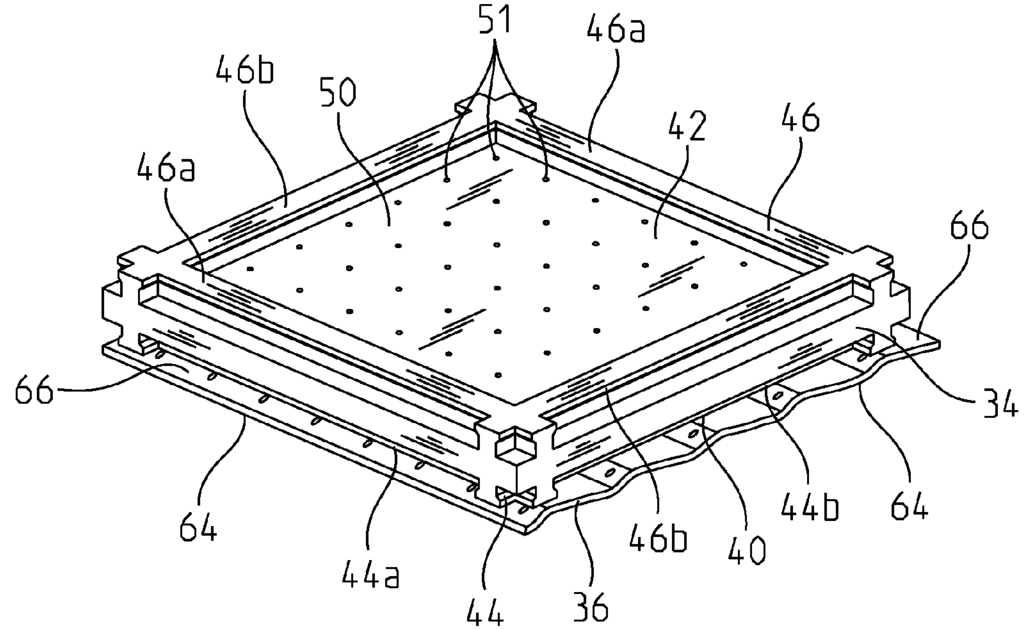
FIG. 3 is a perspective view of a section of a panel for forming the transition duct with an outer subpanel removed to view an outer side of a middle subpanel.

As seen in FIG. 3, adjacent pairs of the outer circumferential rib members 46*a* and adjacent pairs of the outer axial rib members 46*b* are located to form a plenum area 50 therebetween. The plenum areas 50, as illustrated in the present embodiment, may have a generally rectangular configuration to define a grid of adjacent plenum areas 50 located around the circumference and along the length, or along at least a portion of the length, of the duct 26. A plurality of effusion holes 51, such as a grid of effusion holes 51, are formed extending between the inner and outer sides 40, 42 of the middle subpanel 34 in each of the plenum areas 50. The effusion holes may be arranged in rows, and centerline axis 49 of each of the effusion holes 51 is oriented substantially perpendicular to a plane of the middle subpanel 34 in the local area of the effusion hole 51, see FIG. 7.

Figure 5:
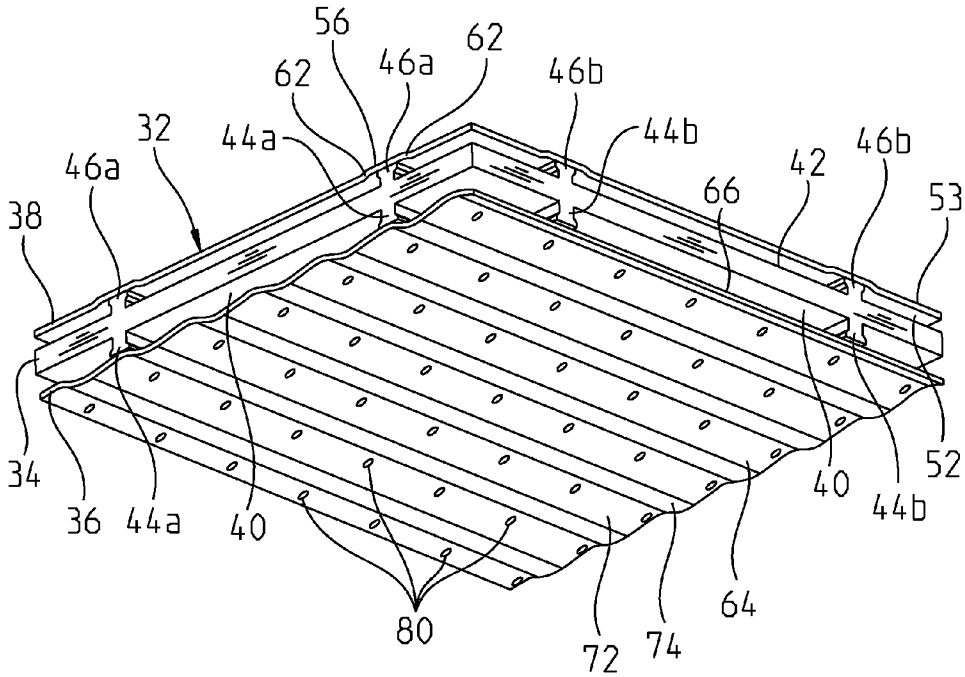
FIG. 5 is a perspective view of the panel for forming the transition duct, viewing an inner surface of the panel.
Figure 7:
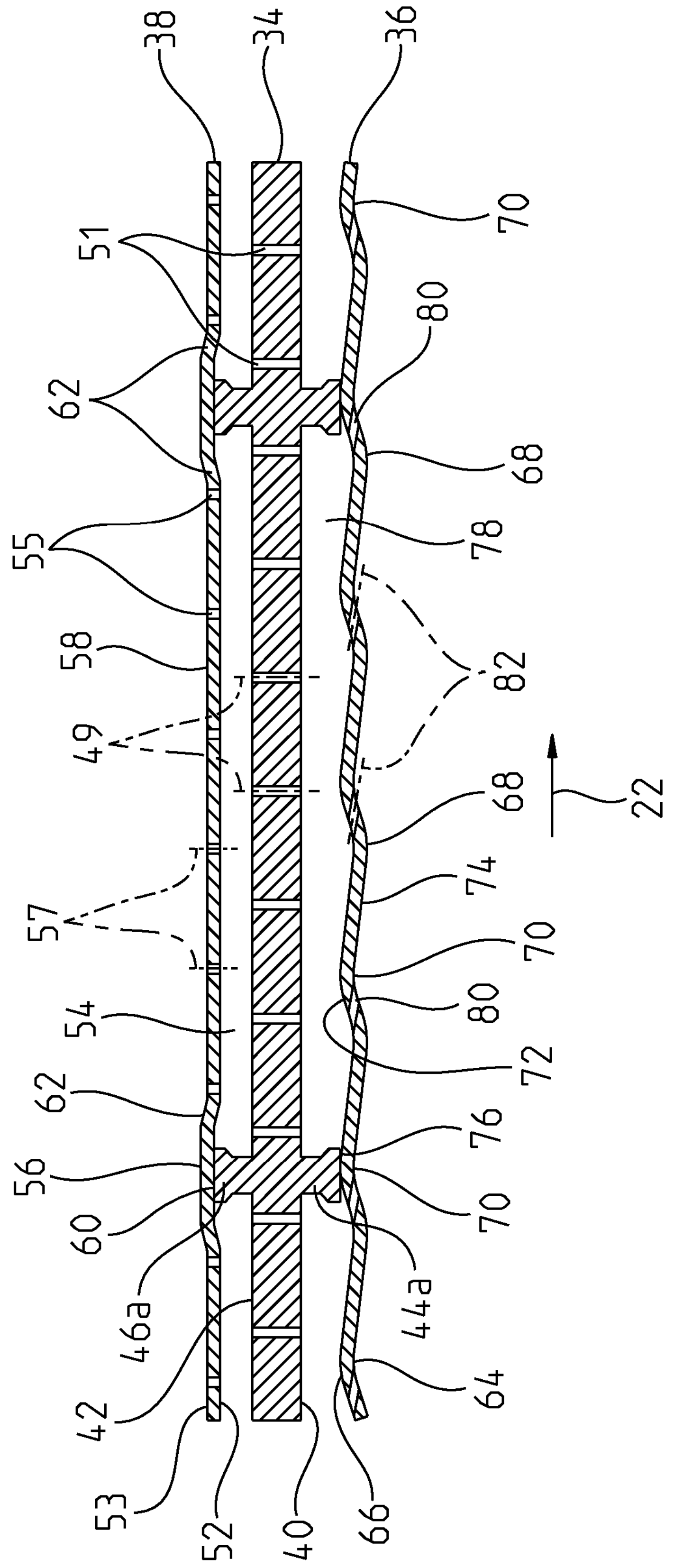
FIG. 7 is a cross-sectional view through a section of the panel forming the transition duct.

Referring to FIGS. 4, 5 and 7, the outer subpanel 38 extends over the plenum areas 50 and includes an inner side 52 engaged on outer edges of the outer ribs 46 to position the outer subpanel 38 in spaced relation to the middle subpanel 34 and define outer plenums 54 therebetween (FIG. 7). The outer subpanel 38 includes outer diffusion holes 55 extending between the inner side 52 of the outer subpanel 38 and an outer side 53 thereof. Preferably, the outer diffusion holes 55 are arranged in rows and displaced circumferentially and axially relative to the effusion holes 51.

The outer subpanel 38 is formed with attachment areas 56 (FIG. 4) for attachment to the outer ribs 46, and the attachment areas 56 surround diffusion areas 58 of the outer subpanel 38. The diffusion areas 58 overlie the plenum areas 50 and comprise recessed areas that are recessed radially inwardly from the attachment areas 56. That is, the diffusion areas 58 comprise substantially planar portions of the outer subpanel 38 having inner side surfaces that are displaced inwardly from a plane extending between radially outer surfaces 60 of adjacent outer ribs 46. The diffusion areas 58 are connected to the attachment areas 56 by radial components 62 extending in a transverse direction from the attachment areas 56 to the diffusion areas 58. The radial displacement of the diffusion areas 58 from the attachment areas 56 via the radial components 62 forms a dimpled outer surface configuration in the outer subpanel 38 whereby a non-linear load path is defined that results in discontinuities in the shear plane of the outer subpanel 38. Thus, thermal stresses that may occur in the outer subpanel 38 will propagate only a limited distance, limited to the diffusion area 58, and will be substantially isolated from the attachment areas 56 and the ribs 46 by the radial jog provided by the radial components 62.

The outer diffusion holes 55 are located in the portions of the outer subpanel 38 defined by the diffusion areas 58. A centerline axis 57 of each of the outer diffusion holes 55 is oriented substantially perpendicular to a plane of the outer subpanel 38, i.e., a plane of a diffusion area 58, in the local area of the outer diffusion hole 55.

Figure 6:
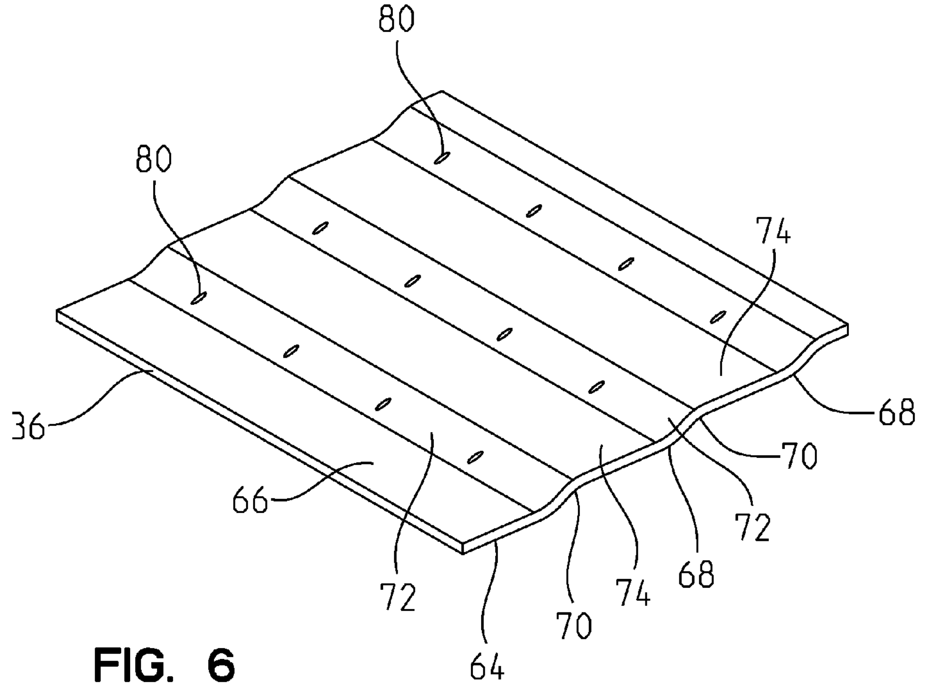
FIG. 6 is a perspective view of the inner subpanel.

Referring to FIG. 6, the inner subpanel 36 comprises an inner side 64 and an outer side 66, and is formed with a wavy or undulating configuration, as seen in an axial side view such as FIGS. 2 and 7. The undulations of the inner subpanel 36 are defined by a plurality of circumferentially extending peaks 68 and troughs 70. The peaks 68 and troughs 70 are defined by a short radial leg 72 and a longer ramp leg 74. The radial leg 72 extends radially outwardly in the direction of gas flow 22

(FIG. 7), and the ramp leg 74 extends from a radially outer end of the radial leg 72 radially inwardly in the direction of gas flow 22. Each of the peaks 68 defines a separation/detachment point for the boundary layer of the gas flow 22, where the gas flow 22 detaches from the inner side 64 as it approaches the radial leg 72 and the gas flow 22 subsequently reattaches to the inner side 64 as it flows along the ramp legs 74.

As seen in FIG. 7, the inner subpanel 36 is supported on the middle subpanel 34 in spaced relation to the inner side 40 of the middle subpanel 34, wherein the inner subpanel 36 is attached to the inner ribs 44 at the troughs 70. In particular, surfaces of the outer side 66 of troughs 70 located adjacent to inner circumferential rib members 44*a* are attached to radially inner surfaces 76 of the adjacent inner circumferential rib members 44*a*. The inner circumferential and axial rib members 44*a*, 44*b* form a grid on the inner side 40 of the middle subpanel 34 in a manner similar to that described for the outer ribs 46. The inner subpanel 36 may additionally be attached to portions of the inner axial ribs 44*b* where they are located adjacent to troughs 70, i.e., at trough locations between adjacent inner circumferential rib members 44*a*. The inner circumferential and axial rib members 44*a*, 44*b* also form inner plenums 78 (FIG. 7) between the adjacent ribs 44, where circumferentially adjacent plenums 78 may be in fluid communication with each other via spaces formed adjacent to the peaks 68. In addition to the above noted boundary flow characteristics, the undulating or rippled configuration of the inner subpanel 36 enables the inner subpanel 36 to stretch and flex resulting in reduced thermally induced loads on the inner subpanel 36.

As seen in FIGS. 6 and 7, the inner subpanel 36 includes rows of film holes 80 extending between the inner side 64 and the outer side 66 of the inner subpanel 36. The film holes 80 may be formed as either film effusion or film diffusion holes, where the film diffusion holes would include a diffuser feature at a downstream end thereof. The film holes 80 are located in the radial legs 72, between the peaks 68 and the troughs 70, and each film hole 80 defines a centerline axis 82 oriented generally parallel, i.e., parallel or at a shallow or small acute angle, relative to an inner surface portion of the inner side 64 defined on the ramp legs 74. The film holes 80 discharge a film of cooling air into the areas adjacent to and downstream from each of the locations where the boundary layer of the hot gases separate from the inner side 64 of the inner subpanel 36.

It should be noted that the thickness of the inner subpanel 36 is selected such that the length (L) of the film holes 80 is at least two times the diameter (D) of the film holes 80, i.e., $L/D \geqq 2.0$, in order to permit directional control of the film jets emitted through the film holes. Generally, the thickness of the inner subpanel 36 should be such that it is not possible to see through the film holes 80 when viewed radially in a direction perpendicular to the area of the subpanel inner side 64. In addition, in the case that the film holes 80 comprise film diffusion holes, then the inner subpanel 36 would be formed with a greater thickness sufficient to accommodate the diffuser feature provided at the downstream end of the film holes 80.

Types of materials that may be employed to manufacture the middle subpanel 34, inner subpanel 36, and outer subpanel 38 include Hastelloy X, IN-617, and Haynes 230. The inner subpanel 36 and outer subpanel 38 need not comprise structural members of the duct 26, and are substantially thinner than the middle subpanel 34. For example, the inner and outer subpanels 36, 38 may be formed with a thickness that is four to five times thinner than the middle subpanel 34. The inner and outer subpanels 36, 38 may be formed by a stamping process. Further, the outer subpanel 38 may be formed by a mandrel that presses this thin subpanel over the outer ribs 46 to thereby provide a positive contact area for secure attachment to the outer ribs 46. Attachment of the inner and outer subpanels 36, 38 to the respective inner and outer ribs 44, 46 may be accomplished, for example, by welding or diffusion bonding.

Figure 8:
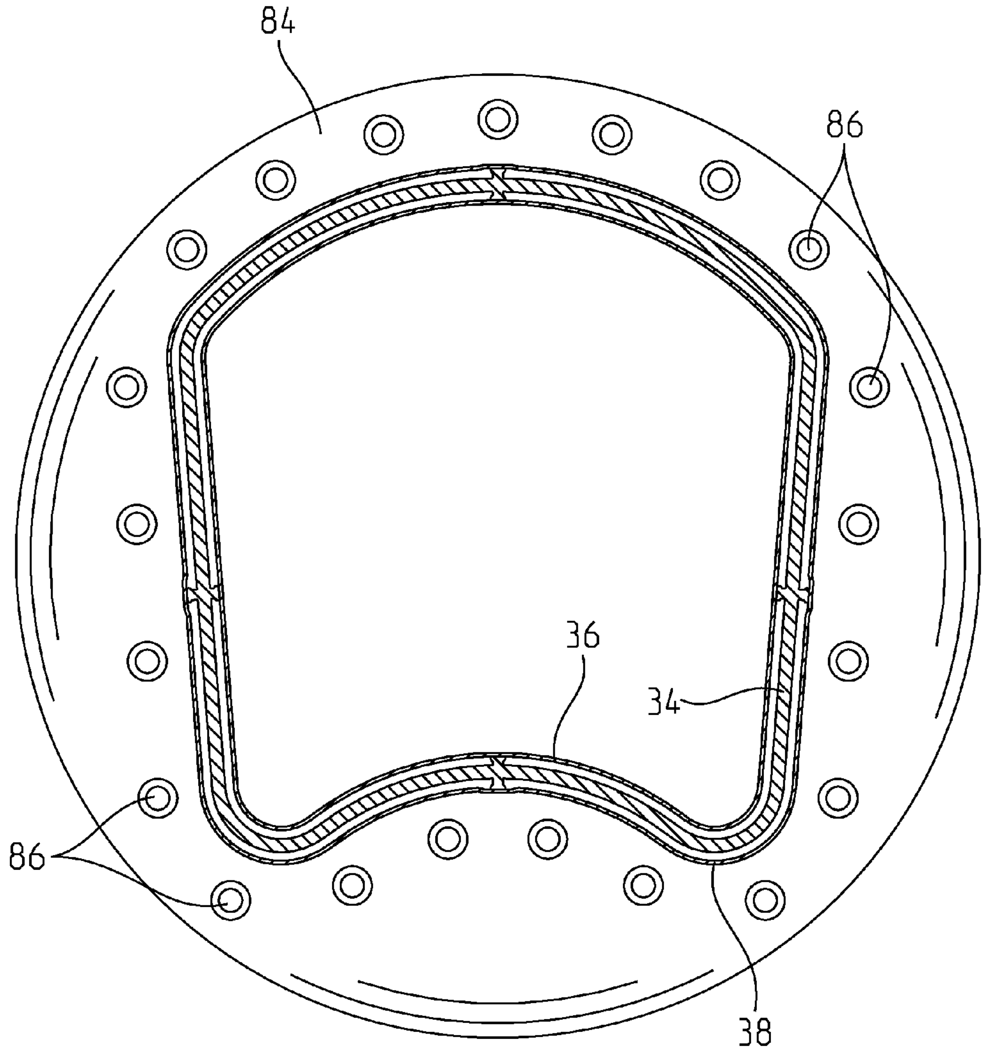
FIG. 8 is a cross-sectional view through the transition duct, and taken at a location indicated by line 8-8 in FIG. 2.

Referring to FIGS. 2 and 8, a flange 84 may be located at one or both ends of the duct 26, and is illustrated herein as formed integrally with the middle subpanel 34 at the outlet end 30 of the duct 26. The flange 84 may include apertures 86 formed therethrough for receiving bolts (not shown) to attach the duct 26 to adjacent structure within the turbine casing 11 (FIG. 1). Similar support for the duct 26 may be provided at the inlet end 28. The relatively thick middle subpanel 34 provides supporting structure for the duct 26, extending between the inlet and outlet ends 28, 30, and providing a support for the attached relatively thinner inner and outer subpanels 36, 38. In addition, the configuration of the middle subpanel 34, comprising the inner and outer ribs 44, 46 formed on the inner and outer sides 40, 42, further promotes the structural stiffness of the middle subpanel 34.

The inner subpanel 36 functions as a shield or inner shell, insulating the middle subpanel 34 from direct contact with the hot gases flowing through the duct 26. Similarly, the outer subpanel 38 functions to isolate the middle subpanel 34 from direct contact with shell air which is relatively substantially cooler air provided to the interior of the casing 11 from the compressor 20 (FIG. 1). The outer subpanel 38 meters cooling air through the outer diffusion holes 55, causing the air to diffuse and impinge on the outer side 42 of the middle subpanel 34 to cool the middle subpanel 34. The air passes from the outer plenums 54 through the effusion holes 51 in the middle subpanel 34 into the inner plenums 78 and impinges on the outer side 66 of the inner subpanel 36 to generate enhanced impingement heat transfer on the outer side 66 of the inner subpanel 36. Subsequently, the air is diffused from the inner plenums 78 through the film holes 80 to form a film of cooling air along the inner side 64 of the inner subpanel 36. Further, the inner side 64 of the inner subpanel 36 may be provided with thermal barrier coating (TBC) 88 which, in combination with the impingement cooling of the outer side 66 and the film cooling of the inner side 64, facilitates maintaining the material of the inner subpanel 36 within its operable temperature limit.

Providing the inner and outer subpanels 36, 38 on either side of the middle subpanel 34 reduces the temperature gradient through the thickness of the middle subpanel 34, and hence reduces the thermally induced strain experienced by this subpanel. In addition, the inner and outer subpanels 36, 38, while being exposed to direct contact with the respective hot and cool flows around the duct 26, maintain relatively low thermal gradients, and thus develop relatively low thermally induced strain, through their thicknesses due to their relatively thin construction. The reduced strain in the subpanels 34, 36, 38 decreases the potential for mechanical failures, such as cracks and detached welds or bond connections. Further, providing the middle subpanel 34 as the structural (load carrying) member permits variations in the configuration of the inner and outer subpanels 36, 38, where the inner and outer subpanels 36, 38 may be configured to provide desired thermal characteristics without being constrained to provide structural support to the duct 26.

The structure of the duct panel 32 described herein is particularly beneficial in applications with engines where there are high temperature and high pressure differences between the inside and outside of the duct 26. The present three-layer design for the panel 32 reduces the flow rate of cooling air required by providing a tortuous path for the flow of cooling air, operating to meter the flow of air to the interior of the duct 26 and providing impingement cooling of the middle subpanel 34 and inner subpanel 36, while additionally metering air for film cooling the inner side 64 of the inner subpanel 36. A typical location that may benefit from the present panel construction comprises the area of the duct 26 adjacent to the duct outlet end 30, just before the row one blades of the turbine section 24. At this location, the hot combustion gas 22 in the duct 26 has been significantly accelerated with a corresponding large pressure drop in the duct 26, such that a large pressure differential exists between the inside and outside of the duct 26. Accordingly, the panel 32 may be provided along a portion of the duct 26, such as in a location of greatest pressure differential across the panel 32, or the panel 32 may form the entire duct 26, as is illustrated in FIG. 1.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A panel of a transition duct that connected to an inlet of a turbine section for a gas turbine engine, the panel comprising:

a middle subpanel having an inner side and an outer side;

an inner subpanel having inner and outer sides, and located adjacent to the inner side of the middle subpanel;

an outer subpanel having inner and outer sides, and located adjacent to the outer side of the middle subpanel;

inner spacer members extending from the inner side of the middle subpanel and attached to the outer side of the inner subpanel to space the inner subpanel out of contact with the middle subpanel and define an inner plenum between the middle subpanel and the inner subpanel;

outer spacer members extending from the outer side of the middle subpanel and attached to the inner side of the outer subpanel to space the outer subpanel out of contact with the middle subpanel and define an outer plenum between the middle subpanel and the outer subpanel;

a plurality of effusion holes formed through the middle subpanel connecting the outer plenum to the inner plenum;

a plurality of outer diffusion holes formed through the outer subpanel for passing a flow of cooling air from a high pressure region surrounding the outer side of the outer subpanel of the transition duct through the outer diffusion holes into the outer plenum; and a plurality of film holes formed through the inner subpanel for passing a flow of cooling air from the inner plenum through the film holes into a hot gas flow adjacent to the inner side of the inner subpanel.

2. The panel as recited in claim 1, wherein the film holes are oriented generally parallel to a surface of the inner side of the inner subpanel.

3. The panel as recited in claim 1, wherein the outer subpanel includes attachment areas and recessed areas substantially surrounded by the attachment areas, the attachment areas being attached to the outer spacer members, and including radial components extending transverse from the attachment areas to the recessed areas.

4. The panel as recited in claim 3, wherein the recessed areas comprise generally planar areas of the outer subpanel, and the outer diffusion holes are formed in the recessed areas.

5. The panel as recited in claim 1, wherein the inner subpanel is defined by an undulating surface formed by a plurality of peaks and troughs.

6. The panel as recited in claim 5, wherein the inner subpanel is attached to the inner spacer members at the troughs, and the film holes are formed between the peaks and the troughs.

7. The panel as recited in claim 1, wherein the middle subpanel is thicker than both the inner subpanel and the outer subpanel.

8. The panel as recited in claim 7, including a flange integral with the middle subpanel and extending perpendicular to middle subpanel for supporting the panel on an adjacent structure of the turbine engine.

9. The panel as recited in claim 1, wherein the inner and outer spacer members comprise ribs formed integrally with the middle subpanel.

10. The panel as recited in claim 9, wherein the inner plenum is defined between the ribs forming the inner spacer members and the outer plenum is defined between the ribs forming the outer spacer members.

11. A transition duct for conveying hot combustion gas from a combustor to a turbine in a gas turbine engine, the transition duct comprising:

a panel including a middle subpanel, an inner subpanel, and an outer subpanel;

the inner subpanel is located in spaced relation to an inner side of the middle subpanel to define an inner plenum between the middle and inner subpanels, and the outer subpanel is located in spaced relation to an outer side of the middle subpanel to define an outer plenum between the middle and outer subpanels;

the inner subpanel including an inner side defining an axial gas flow path through the transition duct;

a plurality of effusion holes formed through the middle subpanel connecting to the outer plenum to the inner plenum;

a plurality of outer diffusion holes formed through the outer subpanel for passing a flow of cooling air from a high pressure region surrounding the outer subpanel through the outer diffusion holes into the outer plenum;

a plurality of film holes formed through the inner subpanel for passing a flow of cooling air from the inner plenum through the film holes into the axial gas flow path adjacent to the inner side of the inner subpanel; and wherein the transition duct having an inlet end connected to a combustor liner outlet end and an outlet end connected to an inlet of a turbine liner upstream of turbine inlet guide vanes.

12. The transition duct as recited in claim 11, wherein the middle subpanel comprises a relatively thick structural member of the transition duct, and the inner and outer subpanels comprise relatively thin members supported on the middle subpanel.

13. The transition duct as recited in claim 12, wherein the middle subpanel includes outer ribs extending from the outer side of the middle subpanel, and the outer subpanel includes attachment areas attached to the outer ribs and diffusion areas defining the outer diffusion holes radially displaced from the attachment areas.

14. The transition duct as recited in claim 13, wherein the diffusion areas comprise recessed areas defined as substantially planar areas located radially inwardly from a plane extending between radially outer surfaces of adjacent outer ribs.

15. The transition duct as recited in claim 14, wherein the outer ribs form a grid comprising a plurality of diffusion areas, each of the diffusion areas surrounded by the outer ribs, and each of the diffusion areas comprise one of the recessed areas and are surrounded by the attachment areas attached to adjacent ones of the outer ribs.

16. The transition duct as recited in claim 12, wherein the inner subpanel is defined by an undulating surface formed by a plurality of peaks and troughs.

17. The transition duct as recited in claim 16, wherein the middle subpanel includes inner ribs extending from the inner side of the middle subpanel, the inner subpanel is attached to the inner ribs at the troughs, and the film holes are formed between the peaks and the troughs.

18. The transition duct as recited in claim 17, wherein the film holes define a centerline axis oriented generally parallel to a portion of an inner side of the inner panel.

* * * * *